INVENTOR.
HUGH B. FREY JR.
BY
his ATTORNEYS

Nov. 2, 1965   H. B. FREY, JR   3,215,836
APPARATUSES AND METHODS RELATING TO
PRODUCTION OF NEUTRON RADIATION
Original Filed April 9, 1952   3 Sheets-Sheet 2

INVENTOR.
HUGH B. FREY JR.

BY
Brumbaugh, Free, Graves & Donohue
his ATTORNEYS

Nov. 2, 1965    H. B. FREY, JR    3,215,836
APPARATUSES AND METHODS RELATING TO
PRODUCTION OF NEUTRON RADIATION
Original Filed April 9, 1952    3 Sheets-Sheet 3

INVENTOR.
HUGH B. FREY JR.
BY
Brumbaugh, Free, Graves & Donohue
his ATTORNEYS

United States Patent Office 3,215,836
Patented Nov. 2, 1965

3,215,836
APPARATUSES AND METHODS RELATING TO PRODUCTION OF NEUTRON RADIATION
Hugh B. Frey, Jr., Southbridge, Mass., assignor, by mesne assignments, to Schlumberger Well Surveying Corporation, Houston, Tex., a corporation of Texas
Original application Apr. 9, 1952, Ser. No. 281,326, now Patent No. 2,769,096, dated Oct. 30, 1956. Divided and this application Oct. 23, 1956, Ser. No. 617,824
36 Claims. (Cl. 250—83.6)

The present invention relates to sources of radioactive radiations and, more particularly, to novel radiation sources employing a plurality of targets which are bombarded by high-speed particles, and to novel methods of nuclear well logging employing such sources.

This application is a division of copending application Serial No. 281,326, filed April 9, 1952 (now United States Patent 2,769,096 issued October 30, 1956).

There are in present use in many laboratories sources of radioactive radiation which in general comprise a source of electrically-charged particles and a charged-particle accelerator for directing said particles at a high velocity against a reactive target. By properly selecting the type of particles, the target material and the particle velocity at the instant of bombardment, a particular nuclear reaction, as for example the generation of neutrons, may be obtained at the target. As a result of the high cost, complexity and large size of these sources and their associated equipment they have heretofore been unsuited for field use. However, in copending applications Serial No. 275,932, filed March 11, 1952, for "Neutron Well Logging" by Clark Goodman and Serial No. 281,378, filed April 9, 1952, for "Neutron Source for Well Logging" by John T. Dewan, now Patent No. 2,973,441, issued February 28, 1961, there are disclosed portable sources which may be readily employed in the field, as for example in the narrow confines of boreholes far beneath the surface of the earth.

It is often desirable, however, to obtain similar nuclear reactions from radioactive sources at a plurality of relatively spaced locations, or different nuclear reactions simultaneously at substantially the same location. In order to accomplish this a plurality of sources of radioactive radiation have heretofore been needed, a requirement which was substantially impossible to satisfy in field applications because of the expense and bulk involved.

Accordingly, it is an object of the present invention to provide novel sources of radioactive radiations wherein a plurality of distinct nuclear reactions may be simultaneously or selectively produced.

In radioactivity well logging of the earth formations traversed by a borehole, a source of neutrons or other radiation such as gamma rays is passed through a borehole and indications obtained of one or more physical phenomena resulting from the interaction of the neutrons or gamma rays on formation materials.

It is a further object of the present invention to provide novel methods for nuclear well logging in which a plurality of controlled nuclear reactions are employed to generate neutrons or other radiation within a borehole.

These and other objects of the invention are attained by providing an evacuated envelope containing a source of charged particles. Targets which contain a substance adapted to enter into a nuclear reaction with said particles are placed within the envelope at several locations spaced from said source of charged particles. Charged particles from the source are accelerated to a sufficient velocity towards each target, either simultaneously or in any desired sequence. The target materials and/or the respective particles velocities may be different for each target, and a plurality of distinct nuclear reactions thus obtained.

In a preferred form of the invention, which is particularly adapted for radioactivity well logging, the particle source, which may be for example a source of deuterium ions (deuterons), is placed intermediate the ends of an elongated, cylindrical envelope. At each end within the envelope there is disposed a suitable target facing the ion source, the electrical potential of which relative to said source may be controlled in a predetermined manner or at the discretion of an operator. The targets at each end may contain the same material, as for example tritium, or each may contain a different material, as for example tritium and deuterium, respectively, and may be sequentially or continuously maintained at a negative potential with respect to the ion source sufficient to accelerate particles from the source to a desired velocity for bombardment of the respective targets. As explained in the aforementioned Goodman application, the bombardment of a target containing tritium or deuterium by deuterons of sufficient velocity will generate neutrons.

This source of radioactive radiations may be placed in a suitable pressure-resistant housing and passed through a borehole for the purpose of bombarding the formations with neutrons from the respective targets. If a neutron or gamma ray detector is placed in the vicinity of one end of the elongated envelope and synchronized with alternately activated targets, so-called neutron-neutron or neutron-gamma logs will be obtained for two different source-detector spacings. Other novel logging methods and improved neutron logging methods, employing the multiple-target radiation source, will be explained hereinafter.

The invention will be more fully understood with reference to the accompanying drawings, in which.

The novel multiple-target radioactive radiation sources are hereinafter described in connection with new and improved well logging methods, but it is to be understood that multiple-target radiation sources constructed in accordance with the present invention may be employed in any suitable location as, for example, in laboratories interested in nuclear research.

Figure 1:
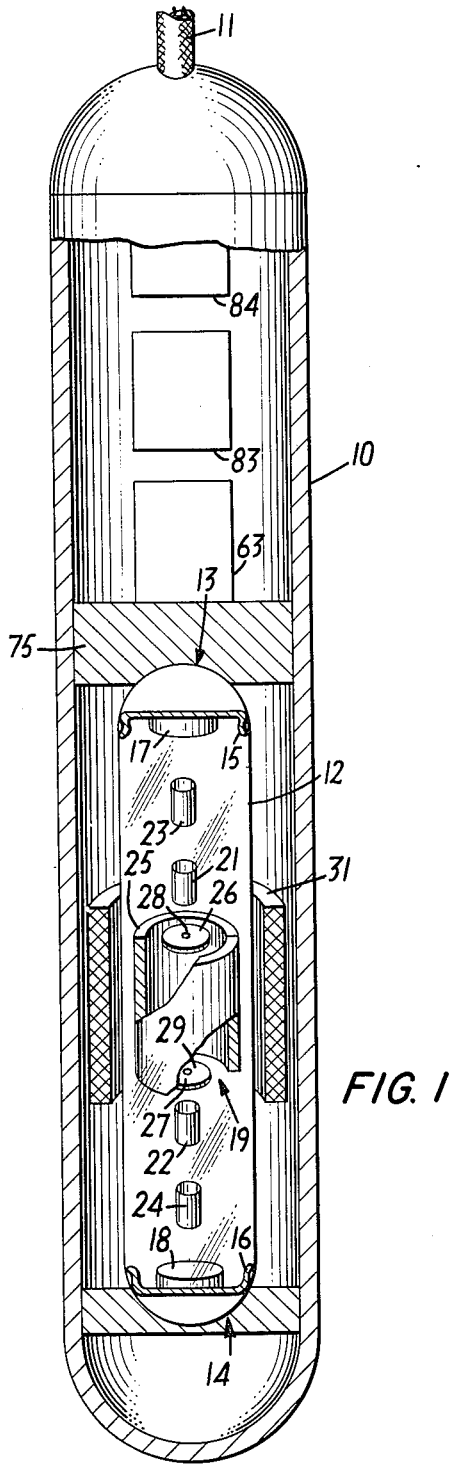
FIG. 1 is a view in longitudinal section showing a two-target radiation source constructed in accordance with the invention and contained within well logging apparatus.

In FIG. 1, a hollow, pressure-resistant housing 10, constructed of steel for example, is adapted to be passed through a borehole by means of a conventional electrical cable 11. Within the housing 10 is an elongated, pressure-resistant envelope 12 which may be manufactured from out-gassed glass or other conventional material. Adjacent each end 13 and 14 of the envelope 12 are placed target electrodes 15 and 16, respectively, having target materials 17 and 18, respectively, mounted thereon. Centered in and coaxial with the envelope 12 is an ion source 19. Between the ion source 19 and the target electrode 15 there may be spaced one or more electrodes, as for example ion extraction and focussing electrodes 21 and 23. Between the source 19 and the target electrode 16 there may be spaced similar electrodes 22 and 24.

The ion source 19 is of the cold-cathode low-pressure type and may take the form of a Philips ionization gauge, the theory of which is fully described in "Vacuum Equipment and Techniques" by Guthrie and Wakerling (McGraw-Hill 1949) on pages 128–137. The ion source comprises a cylindrical tubular anode electrode 25 and disc-shaped cathode electrodes 26 and 27 spaced apart from the electrode 25 at either end thereof. The cathode electrodes 26 and 27 have apertures 28 and 29 therein opposite the target electrodes 15 and 16, respectively. A solenoid or permanent magnet 31, placed concentrically about the ion source 19 provides a strong magnetic field axially through the cylindrical anode electrode 25.

In a typical embodiment the envelope 12 may be evacuated and then filled with deuterium gas at a pressure of approximately $10^{-4}$ millimeters of mercury. The target materials 17 and 18 may contain tritium, and each may be constructed as a tungsten disc coated with zirconium that is impregnated with tritium.

Figure 2:
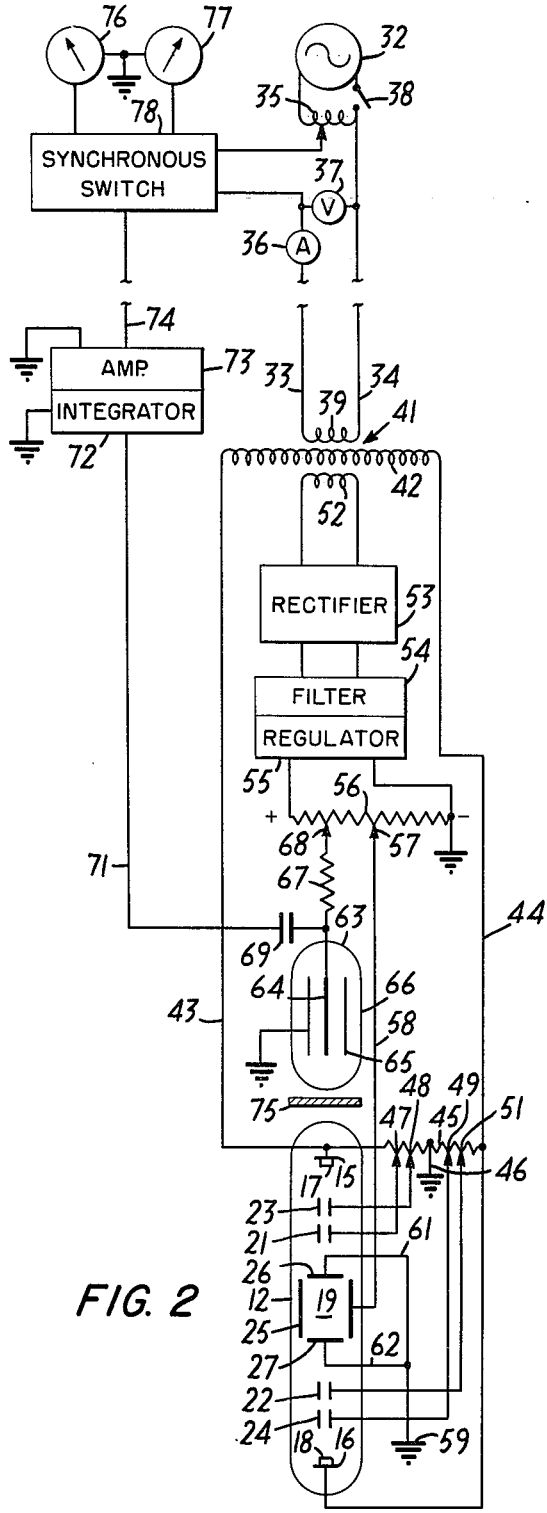
FIG. 2 is a schematic diagram of one form of an electrical circuit that may be employed with the radiation source shown in FIG. 1 for causing the targets to be sequentially bombarded.

One manner in which the two-target radiation source shown in FIG. 1 may be operated is explained in connection with FIG. 2. In FIG. 2 an electric power source 32, which may provide a constant amplitude alternating potential, supplies the necessary operating voltages from the surface of the earth to the equipment within the housing 10 by means of insulated cable conductors 33 and 34. The potential difference appearing between the conductors 33 and 34 is preferably adjustable, for example, by an autotransformer 35. The current and potential are observable by means of meters 36 and 37, respectively. A conventional disconnecting switch 38 is inserted in the output of the source 32. The conductors 33 and 34 are connected across a primary winding 39 of a multi-winding transformer 41 within the housing 10. The alternating potential difference across the winding 39 is stepped-up, if necessary, by means of a secondary winding 42 of the transformer 41 to a predetermined peak value in the range of from 20 to 100 kilovolts where the radiation source employs a deuterium ion source and a tritium target substance. This alternating potential across the secondary winding 42 is supplied by means of conductors 43 and 44 across a resistor 45 to the target electrodes 15 and 16, respectively. The resistor 45 is tapped to ground by means of a variable contact 46 intermediate the ends thereof. If, for example, the resistor 45 is center-tapped by the contact 46, target electrodes 15 and 16 will alternately be at equal but opposite-polarity potentials. Additional contacts 47, 51 and 48, 49 on the resistor 45 supply the potentials necessary for the operation of ion extraction and focussing electrodes 21, 22 and focussing electrodes 23, 24, respectively.

A third winding 52 of the transformer 41 applies a substantially constant amplitude alternating potential to a rectifier 53 which supplies direct current through a smoothing filter 54 and a voltage regulator 55 to a load resistor 56. A tap 57 on the resistor 56 applies a positive potential, say 500 volts, over a conductor 58 to the cylindrical anode 25 of the ion source 19. The disc-shaped cathodes 26 and 27 may be grounded at 59 by means of conductors 61 and 62, respectively.

The target electrodes 15 and 16 are alternately at high negative and positive potentials with respect to the ion source cathodes 26 and 27, whereas the ion anode electrode 25 is maintained at a constant positive potential with respect to the cathodes 26 and 27. As a result of the interaction of the electric field caused by the potential difference between the cathode electrodes 26 and 27 and the anode electrode 25 and the axial magnetic field, ions will be created even in the presence of extremely low gas pressure. When deuterium gas is employed as explained in the above-mentioned Dewan application, deuterons will be produced by the ion source 19. When the target electrode 15 becomes negative with respect to the cathode 26, deuterons will tend to be accelerated towards this target. When the target electrode 15 reaches a high negative potential, say 20 kilovolts, deuterons will bombard the target material 17 with sufficient velocity to generate neutrons at an energy level of substantially 14 million electron volts (mev.). As the negative accelerating potential is increased still further, say to 100 kilovolts, the flux intensity of the 14 mev. neutrons will increase, but will decrease and then reach zero as the accelerating potential is decreased.

During the next half cycle, the target electrode 16 will be similarly activated. It can thus be seen that neutrons will be alternately generated at targets 15 and 16, respectively.

The cyclically operated neutron sources have many well logging applications, as will be hereinafter explained. For example, a radioactivity detector 63 may be placed opposite one end 13 of the envelope 12. The detector 63 may be, for example, a Geiger counter adapted to produce an electrical pulse in response to an impinging gamma particle, the frequency of the pulses being proportional to the flux intensity of the gamma radiation present. The detector 63 may be conventionally constructed with a center wire anode 64 surrounded by a cylindrical tubular cathode 65, and both electrodes are contained within an envelope 66 filled with gas. The center wire anode 64 is supplied with a positive potential, say 1000 volts, through a series impedance 67 connected by a contact 68 to the load resistor 56. The cylindrical cathode 65 may be grounded. The pulse output may be applied through a coupling capacitor 69 and a conductor 71, to, for example, an integration circuit 72 and an amplifier 73. The output signal from the amplifier 73 is transmitted to the surface of the earth by means of an insulated cable conductor 74.

A suitable shield 75, as for example several inches of lead, is preferably placed between the radioactivity detector 63 and end 13 of the envelope 12. The shield 75 may be eliminated altogether, if desired, since the deuterium-tritium reaction yields a low intensity of gamma radiation.

In neutron well logging the spacing between the neutron source and the radioactivity detector is critical. If the spacing is less than a certain relatively short distance, the output of the detector will increase with the hydrogen content of the surrounding medium, but if the spacing is more than this distance, the output will decrease with increasing hydrogen content. The critical distance from the neutron source of the "cross-over" zone is a function of the hydrogen content of the liquid in the borehole, and may be from 4 to 8 inches. However, if the spacing between the target electrode 15 and the detector 63 is on the order of 3 inches, when neutrons are emitted from the target material 17, the pulse frequency of the detector 63 will increase with increased hydrogen content of the surrounding formations. However, when neutrons are emitted by the target material 18, the detector output will decrease with hydrogen content, since the target electrode 16 is on the order of 20 to 24 inches from the detector 63.

The output of the detector 63 is preferably separately recorded during alternate half cycles of target activations. For example, a switch 78 may be synchronized by the alternating current source 32 to connect a recording galvanometer 76 to the conductor 74 during the period when the target material 17 is activated and to connect a similar galvanometer 77 to the conductor 74 when the target material 18 is activated. Accordingly, two continuous logs are simultaneously obtained for substantially the same detector depths in the borehole, one varying directly with hydrogen content, the other inversely. Accordingly, a novel method is provided for obtaining a plurality of indications of the hydrogen content of formation material and thus formation porosity, at the same level, one corresponding to a short radius of investigation and great detail, the other to a larger radius but with less detail.

It will be understood that the detector 63 may be beyond the critical spacing for both the target electrode 15 and the target electrode 16, and two logs obtained which vary inversely with hydrogen content but with different radii of investigation and detail.

By moving the contact 46 on the resistor 45, the high potentials applied to the target electrodes 15 and 16 may be adjusted to different respective maxima. For example, the target electrodes 15 and 16 may have negative maxima of 20 kilovolts and 100 kilovolts, respectively, whereby the neutron flux intensity from the target material 18 will be substantially greater than the flux intensity from the material 17. As a result of the detector-source spacings this inequality will have advantages under certain circumstances.

Figure 7:
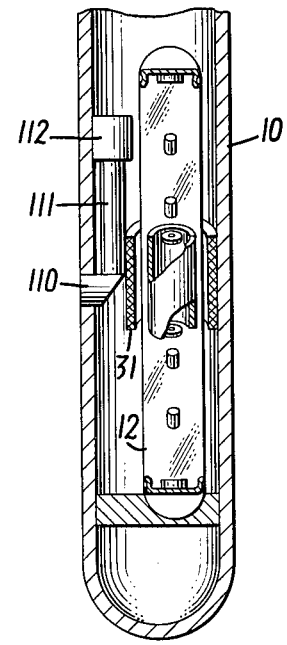
FIGS. 6 and 7 are views in longitudinal section showing two ways in which radioactivity detectors may be associated with the multiple-target radiation source.
Figure 6:
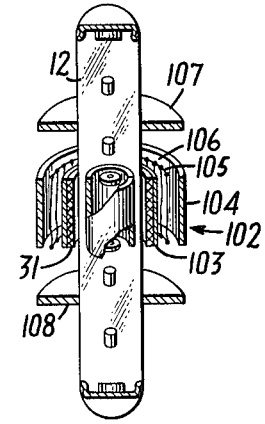

Alternatively, the radioactivity detector 63 may be placed intermediate the target electrodes 15 and 16, as shown in FIGS. 6 and 7 for example. If substantially the same neutron flux intensity is emitted by both targets, a differential log may be obtained, the meters 76 and 77 showing a difference in amplitudes only when a formation boundary or a change in the hydrogen content of formation material is passed. This differential log may be recorded on a single meter, if desired, by employing any well-known electrical comparing circuit, the output signal from which is directly proportional to the difference in the amplitudes or frequencies of the two input signals. If different neutron flux intensities are employed, a centered detector will give alternate radioactivity indications corresponding to the different flux intensities at an equal detector-source spacing. This mode of operation is valuable, for example, in determining the effect of the drilling liquid on the respective measurements.

Different nuclear reactions may be produced at each target irrespective of the placement of the detector 63 with respect to the target electrodes 15 and 16. For example, while employing deuteron particles, the targets may be impregnated one with tritium and the other with deuterium. If both targets are maintained at 100 kilovolts, for example, neutrons of different energies, substantially 14 mev. from the tritium target and 2.3 mev. from the deuterium target, will be emitted and separate radioactivity indications may be obtained. Since the formation reaction is a function of the neutron energy, the separate indications will have individual interpretations. Other reactions or combinations of reactions may be employed. For example, beryllium or lithium targets when bombarded by deuterons will emit neutrons.

The detector 63 may be made responsive to induced gamma radiation, that is gamma rays of from 2 to 8 mev., but substantially unresponsive to direct and scattered gamma radiation, that is gamma rays having less than about 1 mev. energy, by placing a lead shield therearound having a thickness of, say, ¼ inch. Alternatively, the detector 63 may be made responsive substantially only to neutrons, whereby neutron-neutron logs may be obtained. In a preferred arrangement the detector 63 is made responsive simultaneously to both induced gamma radiation and thermal neutrons to increase substantially the resolution of the measurements. For example, the detector 63 may be a Geiger Muller counter having a thin cadmium sheath, say 1 millimeter in thickness, placed inside the ¼ inch lead shield.

The detector 63 may be a counter of the type filled with $BF_3$ and thus capable of detecting primarily gamma radiation in the Geiger range of operation and primarily neutron radiation in the proportional range of operation. The response of the detector 63 may be changed from a proportional to a Geiger characteristic by increasing its anode potential. Thus the gamma radiation produced in the formations as a result of neutron emission from the target 15 may be detected by operating the detector 63 in the Geiger range during the interval when the target 15 is being bombarded. On the other hand, neutron radiation received from the formations in response to neutron emission from the target 16 may be detected by lowering the anode potential and consequently operating the detector 63 in the proportional range during the half cycle in which the target 16 is being bombarded.

In the following arrangement, two neutron-neutron logs and two neutron-gamma logs may be simultaneously obtained, with but a single detector. During a first full cycle of target activations, the detector 63 is neutron responsive and thus neutron-neutron logs are obtained for two spacings and/or two neutron flux intensities, and/or two neutron energies. During the next full cycle, the detector 63 is gamma responsive and thus neutron-gamma logs are obtained for two spacings and/or two gamma intensities, and/or two gamma energies. Obviously four recorders may be employed, each synchronized with the alternating current source 32.

Figure 2A:
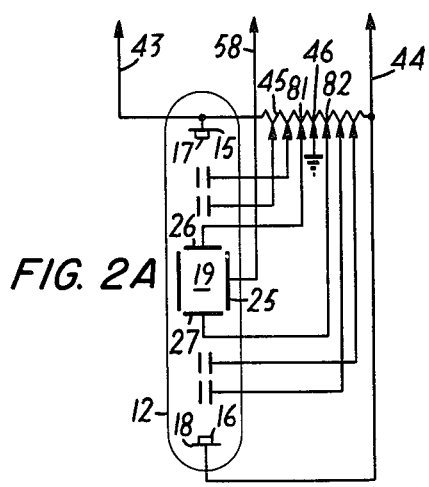
FIG. 2A is a schematic diagram of a modified portion of the electrical circuit shown in FIG. 2.

In FIG. 2A, there is shown a modification of the electrical circuit shown in FIG. 2 whereby the particle acceleration may be made even more efficient. The ion source cathodes 26 and 27 are tapped to the resistor 45 by contacts 81 and 82, respectively, on either side of the ground contact 46 whereby each cathode becomes slightly negative as its associated target electrode becomes highly negative. Thus more particles will tend to pass through the apertures 28 and 29 (FIG. 1) at the correct instants.

FIG. 1 illustrates one manner in which the electrical equipment shown in FIG. 2 may be incorporated into the housing 10. The shield 75 preferably extends for the full diameter of the housing 10 and may be employed as a mounting for radiation source envelope 12. It should be noted that due to the relatively low percentage of gamma radiation emitted by the target materials 17 and 18, when neutron-gamma logs are being obtained, the shield 75 need only be a thin sheet of lead, or no shield at all need be employed. When neutron-neutron logs are being obtained, the shield 75 should be composed of hydrogenous material, as for example paraffin. The rectifier 53, the filter 54 and the voltage regulator 55 may be placed in suitable direct voltage control housing 83. The amplifier 73 and the integrator 72 may be placed in a housing 84. Thus, when the housing 10 is passed through a borehole, continuous radioactivity logs may be recorded at the surface as a function of the depth of the housing.

Figure 3:
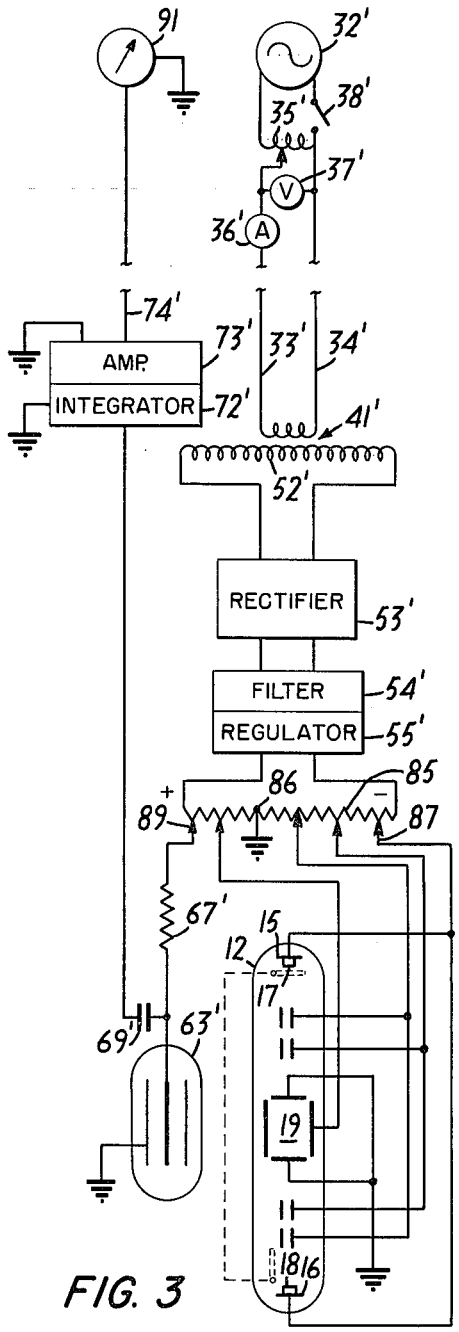
FIG. 3 is a schematic diagram of a second form of an electrical circuit that may be employed with the radiation sources shown in FIG. 1 for causing the targets to be continuously bombarded.

FIG. 3 shows a typical electrical circuit for simultaneously radioactivating the materials 17 and 18 on the target electrodes 15 and 16. In this embodiment the target electrodes 15 and 16 are each maintained at a sufficient negative potential with respect to the ion source cathodes 26 and 27, which may be grounded. The cylindrical tubular anode 25 is at a positive potential, say 500 volts. Thus both target electrodes are simultaneously bombarded by deuterons, resulting in nuclear emission from the target materials 17 and 18.

The direct operating potentials may be supplied in any convenient manner. For example, a constant amplitude alternating current source 32' may be connected by cable conductors 33' and 34' to the primary 39' of a step-up transformer 41'. The high amplitude alternating voltage appearing across the secondary 52' of the transformer 41' may be applied to a rectifier 53', a filter 54' and a voltage regulator 55', and the resultant constant high amplitude direct voltage applied across a load resistor 85. The resistor 85 is grounded at a point 86 intermediate positive and negative ends. A tap 87 supplies a suitable negative direct voltage to target electrodes 15 and 16. A positive tap 88 supplies a positive voltage for the cylindrical anode 25.

The nuclear reaction on the formation material caused by the neutrons emitted by the target materials 17 and 18 may be detected by a suitable neutron and/or gamma ray detector 63' located intermediate the target electrodes 15 and 16. Since a plurality of targets are employed, the effective neutron flux intensity is increased with a resulting increase in logging accuracy because the irradiated volume is increased. It will be understood that a suitable off-on switch may be employed whereby the operator at the surface may select only one or the other of the targets for bombardment. If desired, the targets in this embodiment may be alternately bombarded by employing controllable shutters in the ion beam path, as schematically indicated in dotted line in the figure.

Alternatively, the target materials 17 and 18 may be simultaneously bombarded but only during discrete time intervals. Thus in FIG. 2, the electrodes 21 and 23 and the target electrode 15 may be connected to the taps 51 and 49 and the conductor 44, respectively, instead of as shown. Under these conditions each target emits neutrons at the same instant but only during alternate half cycles.

In FIG. 3 the high voltage for the radioactivity detector 63' may have its anode potential supplied from a tap 89 through an impedance 67'. The output signal from the detector 63' is sent to a recording means 91 at the surface of the earth over a conductor 74', after passing through an integrator circuit 72' and an amplifier 73'.

Figure 4:
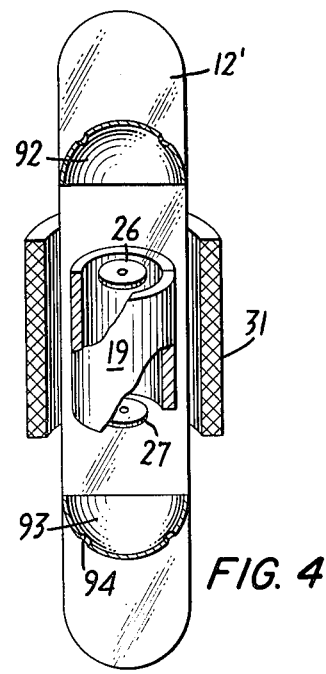
FIG. 4 is a view in longitudinal section of a modified form of multiple-target radiation source.

FIG. 4 illustrates a modified accelerator requiring no ion extraction and focussing electrodes. Target electrodes 92 and 93 replace the target electrodes 15 and 16, respectively, of FIG. 1 and are coated with suitable target material. The electrodes 92 and 93 are concave toward the ion source 19 and may be hemispherical, for example, and placed as close to the ion source 19 as is electrically possible. The design and placement of target electrodes 92 and 93 is such as to subtend the largest possible solid angle with respect to the apertures 28 and 29 in the cathodes 26 and 27, respectively. Thus few of the ions leaving the source 19 will avoid striking the target material. Since the operation of the ion source tends to deplete the amount of gas and lower the gas pressure, it is desirable to increase the volume of gas at the suitable low pressure. Preferably the envelope 12' extends beyond target electrodes 92 and 93 in order to provide the additional evacuated volume containing the low pressure ionizable gas. There should be free gas passage between the source 19 and the remote portions of the envelope 12', as for example by means of parts 94 in the target electrodes 92 and 93. Alternatively, a second gas envelope may be provided at a convenient location and connected to the envelope 12 or 12' by one or more ducts. This latter arrangement is advantageous when the detector 63 is to be placed as near as possible to either target electrode.

Figure 5:
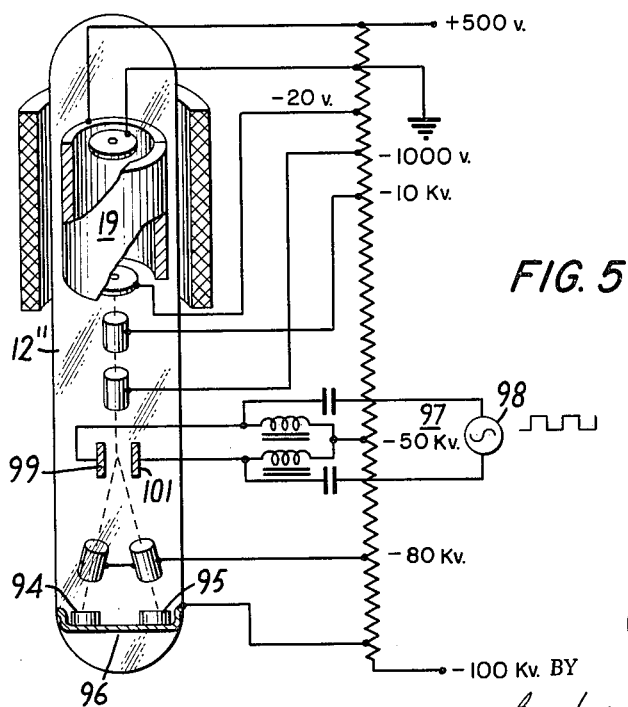
FIG. 5 is a view in longitudinal section of another form of two-target radiation source.

FIG. 5 illustrates a form of the invention in which a plurality of targets 94 and 95 are located at substantially the same level and connected to a common electrode 96. The ion beam from the source 19 is caused to impinge on the targets alternately by an appropriate sweep circuit 97 including a source 98 of voltage and deflection electrodes 99 and 101. Each target may consist of a different material thus giving a different nuclear reaction. The accelerating potential may likewise be varied to provide a proper accelerating voltage as the beam strikes each target. The multiple target arrangement shown in FIG. 5 may be combined with the double-ended modifications heretofore described to provide for a plurality of selectively activated targets at two separate locations.

If it is desired that detector 63' in FIG. 3 be of the class described as ionization chambers, Geiger counters, and proportional counters, it may be constructed as shown in FIG. 6. In FIG. 6 a radioactivity detector 102 comprises a first tubular cathode 103 placed axially about the magnetic means 31. The detector 102 should be designed to minimize the effect of the strong magnetic field or may be magnetically shielded. For this latter purpose the cathode 13 may be made out of material having high magnetic permeability such as Mumetal in order to produce a substantially magnetic-field free space within the detector 102. A second cathode 104 at the same potential as the cathode 103 is placed about an annular grid of anode wires 105 and the entire annular recess 106 between the two cathodes enclosed and filled with ionizable gas in a well-known manner. Shields 107 and 108 are provided surrounding the envelope 12 to protect the detector 102 from direct radiation from the targets.

Since radioactivity detectors of the type disclosed in FIG. 6 may be sensitive to magnetic fields, the scintillation detector shown in FIG. 7 may be employed, as disclosed in copending application Serial No. 255,482, filed November 8, 1951, by Clark Goodman. In FIG. 7 a crystal 110 which emits light in response to radioactivity is mounted in the wall of the housing 10. The light pulses are transmitted through a suitable light transmission channel 111 to a photo-sensitive device 112, the output of which may be transmitted to the surface for recording. Thus the electronic elements which could be adversely affected by magnetic fields are removed from proximity with the magnetic means 31.

In FIG. 2 an alternating potential system is employed whereas in FIG. 3 a direct potential system is shown. These systems may be combined whereby one target electrode is continuously activated and the other activated cyclically or at the discretion of the operator. Thus a modulated neutron log may be obtained. Also, in the embodiments shown schematically in FIG. 2 it may be preferable to always maintain an ion beam and to this end the target electrodes 15 and 16 may be maintained continuously at from 15 to 20 negative kilovolts, for example, and then alternately pulsed to 100 negative kilovolts. Further, while a single radioactivity detector has been disclosed with each embodiment, it will be understood that a plurality of detectors may be employed.

It is evident that the invention may take many alternate forms not specifically illustrated and accordingly the scope of the invention is limited only by the appended claims.

I claim:

1. Apparatus comprising, an envelope containing low pressure deuterium gas as a deuteron supplying medium, means providing a concentration of deuterium at a first site in said envelope, means providing a concentration of tritium at a second site in said envelope, and means to induce a first nuclear reaction between said deuterium concentration and deuterons supplied from said gas and to induce a second nuclear reaction between said tirtium concentration and deuterons so supplied to thereby produce neutron emissions of relatively lower and higher energy from, respectively, said first and second sites as the respective products of said first and second nuclear reactions.

2. Apparatus to investigate matter by neutron radiation comprising, a first neutron source adapted to emit neutrons as the product of deuterium-deuteron nuclear reaction occurring at said first source, a second neutron source adapted to emit neutrons of higher energy than that of neutrons emitted from said first source and to supply said higher energy neutrons as the product of a tritium-deuteron nuclear reaction occurring at said second source, said first and second sources being adapted to irradiate said matter with neutrons emitted therefrom, and means to detect radiation produced by said matter in response to irradiation thereof by neutrons emitted from said sources.

3. Apparatus to investigate the hydrogen content of matter comprising, first and second separated neutron sources each adapted to irradiate said matter with neutrons emitted therefrom to thereby induce said matter to itself produce radiation, and a detector responsive to radiation so produced by said matter to provide an output as a function of the hydrogen content of said matter, said detector being spaced from said first source by a distance less than the minimum value for the crossover distance at which the detector output changes from a direct function to an inverse function of the hydrogen content of said matter, and said detector being spaced from said second source by a distance more than the maximum value for said crossover distance.

4. Apparatus to investigate the hydrogen content of matter comprising, first and second separated neutron sources each adapted to irradiate said matter with neutrons emitted therefrom to thereby induce said matter to itself produce radiation, and a detector adapted responsive to radiation so produced by said matter to provide an output as a function of the hydrogen content of said matter, said detector being spaced from said sources by respective distances which are each more than the maximum value for the crossover distance at which the detector output changes from a direct function to an inverse function of hydrogen content.

5. Apparatus to investigate matter by neutron radiation comprising, a pair of targets each adapted by reacting with impinging ions to emit neutron flux of an intensity dependent on the velocity of the impinging ions, each target being adapted to irradiate said matter with the neutron flux emitted therefrom, ion source means, means to project ions from said source means to said targets, means to render of different value the impingement velocity of ions projected to one and the other of said targets to thereby render of different intensity values the neutron fluxes emitted from said two targets, and means to detect radiation produced by said matter in response to irradiation thereof by the neutron fluxes from said two targets.

6. Apparatus comprising, a pair of targets each adapted by reacting with impinging ions to emit neutron flux of an intensity dependent on the velocity of the impinging ions, ion source means, means to project ions from said source means to said targets, and means to render of different value the impingement velocity of ions projected to one and the other of said targets to thereby render of different intensity values the neutron fluxes emitted from said two targets.

7. Apparatus to investigate matter by neutron radiation comprising, first and second selectively excitable neutron sources each adapted when excited to emit neutrons and to irradiate said matter with the neutrons emitted therefrom to thereby induce said matter to itself produce radiation, means to excite said neutron sources in alternation, and means responsive to said radiation from said matter to indicate the difference of value of said last-named radiation when induced by neutrons from said first source and when induced by neutrons from said second source.

8. Apparatus to investigate matter by neutron radiation comprising, first and second selectively excitable neutron sources separated by a predetermined spacing and each adapted when excited to irradiate said matter with neutrons emitted therefrom to thereby induce said matter to itself produce radiation, means to excite said neutron sources in alternation, a detector disposed intermediate said sources and adapted responsive to said radiation from said matter to produce alternate electric outputs respectively representing the value of said last-named radiation when induced by neutrons from said first source and when induced by neutrons from said second source, switch means operable in synchronism with the alternate excitation of said sources to distribute said outputs to separate circuits, and means adapted by comparing said outputs in said circuits to provide an indication representing the difference of said outputs.

9. Apparatus to investigate matter by neutron radiation comprising, first and second selectively excitable neutron sources separated by a predetermined spacing and each adapted when excited to emit neutron flux of differing intensity value for the two sources, each of said sources being adapted to irradiate said matter with the neutron flux emitted therefrom to thereby induce said matter to itself produce radiation, means to excite said sources in alternation, and a detector disposed intermediate said sources and adapted responsive to said radiation from said matter to provide an output representing said last-named radiation when induced both by neutron flux from said first source and neutron flux from said second source.

10. Apparatus to investigate matter by neutron radiation comprising, at least one neutron source adapted to irradiate said matter with neutrons to thereby induce said matter to itself produce radiation, a detector disposed relative to said source to be adapted to respond to radiation from said matter induced by neutrons from said source, said detector having first and second modes of operation wherein said detector is responsive, respectively, only to gamma radiation from said matter and only to neutron radiation therefrom, and means to selectively produce said first and second modes of operation of said detector.

11. Apparatus comprising, at least one target adapted to react with ions impinging thereon to emit neutrons, an ion gun including an anode spaced from said target and a cathode interposed between said anode and said target, means to apply between said anode and target a varying potential which is at least periodically of a polarity to accelerate ions from the region of said anode to said target, and means operable during the application of said anode-target potential when of ion-accelerating polarity to apply between said anode and cathode a potential which varies in phase with the variation of said anode-target potential.

12. Apparatus to investigate matter by neutron radiation comprising, a pair of targets each adapted by reacting with ions impinging thereon to emit neutrons and to irradiate said matter with said emitted neutrons, ion source means adapted to supply each of said targets with impinging ions when an ion accelerating potential is applied between said source means and the last-named target, means to apply an ion-accelerating potential in the form of a D.C. potential between said source means and each one of said targets, and detector means disposed relative to said targets to detect radiation produced by said matter in response to irradiation thereof by neutrons emitted from said targets.

13. Apparatus comprising, a pair of targets each adapted by reacting with impinging ions to emit neutrons, ion source means adapted to supply each of said targets with impinging ions when an ion-accelerating potential is applied between the source means and the target, and means to apply an ion-accelerating potential in the form of a continuous D.C. potential between said source means and each one of said targets.

14. Apparatus comprising, a pair of targets each adapted by reacting with impinging ions to emit neutrons, ion source means adapted to supply each of said targets with impinging ions when an ion-accelerating potential is applied between the source means and the target, and means to simultaneously apply in ion-acceleratnig potential in the form of an intermittent D.C. potential between said source means and each one of said targets.

15. Apparatus comprising, first and second targets each adapted by reacting with impinging ions to emit neutrons, ion source means adapted to supply each of said targets with impinging ions when an ion-accelerating potential is applied between the source means and the target, and means to selectively apply a D.C. potential as said ion-accelerating potential either between said source means and first target or between said source means and said second target.

16. Apparatus comprising, a pair of targets each adapted by reacting with impinging ions to emit neutrons, ion source means adapted to supply each of said targets with impinging ions when an ion-accelerating potential is applied between the source means and the target, means to apply an ion-accelerating potential in the form of a continuous D.C. potential between said source means and each one of said targets, and a pair of controllable shutter means respectively interposed between said source means and each one of said targets to provide for bombardment in alternation of said targets by ions from said source means.

17. Apparatus to investigate matter by neutron radiation comprising, a longitudinally elongated tubular envelope pervious to neutron radiation, an ion source longitudinally disposed at a central location in said envelope, a pair of targets longitudinally disposed in said envelope on opposite sides of said ion source and each adapted to react with ions from said source to emit neutrons, and a tubular radiation detector partially containing said envelope to surround a local portion thereof longitudinally disposed intermediate said two targets.

18. Apparatus as in claim 17 further comprising a pair of radiation shield members respectively disposed to surround said envelope at locations whereby each of said shield members is interposed between said detector and one of said pair of targets.

19. Apparatus to investigate matter by neutron radiation comprising, a longitudinally elongated tubular envelope pervious to neutron radiation, an ion source longitudinally disposed at a central location in said envelope, a pair of targets longitudinally disposed in said envelope on opposite sides of said target and each adapted to react with ions from said source to emit neutrons, tubular magnetic means surrounding said envelope and ion source and adapted to produce in the region of said source a magnetic field serving two directions from said source to said targets, and a tubular radiation detector surrounding said magnetic means and a local portion of said envelope longitudinally disposed intermediate said two targets.

20. Apparatus to investigate matter by neutron radiation comprising, a pair of targets each adapted by reacting with ions impinging thereon to emit neutrons and to irradiate said matter with said emitted neutrons, ion source means adapted to supply each of said targets with impinging ions when an ion-accelerating potential is applied between said source means and the last-named target, means to apply an ion accelerating potential in the form of a continuous D.C. potential between said source means and one of said targets, and means to intermittently apply an ion-accelerating potential between said source means and the other of said targets.

21. An apparatus to investigate matter by neutron radiation comprising a pair of targets each adapted by reacting with ions impinging thereon to emit neutrons and to irradiate said matter with said emitted neutrons, ion source means adapted to supply each of said targets with impinging ions when an ion accelerating potential is applied between said source means and the last-named target, means to apply an ion accelerating potential in the form of a continuous D.C. potential between said source means and each one of said targets, and means to periodically superpose an additional ion accelerating potential upon the D.C. ion accelerating potential applied between said source means and at least one of said targets.

22. Apparatus to investigate matter by neutron radiation comprising first and second targets each adapted by reacting with ions impinging thereon to emit neutrons and to irradiate said matter with said emitted neutrons, ion source means adapted to supply each of said targets with impinging ions when an ion accelerating potential is applied between said source means and the last-named target, means to apply an ion accelerating potential in the form of a continuous D.C. potential between said source means and each one of said targets, and means to intermittently apply additional ion accelerating potentials in alternation on the respective D.C. ion accelerating potentials which are applied between said source means and first target and said source means and second target.

23. Apparatus comprising an envelope containing low pressure deuterium gas as a deuteron supplying medium, means providing supplies of concentrated deuterium and tritium within said envelope, and means to induce a first nuclear reaction between said concentrated deuterium and deuterons supplied from said gas and to induce a second nuclear reaction between said concentrated tritium and deuterons so supplied to thereby produce neutron emissions of relatively lower and higher energy as the respective products of said first and second nuclear reactions.

24. Neutron generating apparatus comprising means to provide within a confined space a supply of deuterium at least part of which is ionizable to produce deuterons, means to provide a supply of tritium within said confined space, and means to induce deuterium-deuteron and tritium-deuteron nuclear reactions within said confined space to thereby produce neutron emissions of relatively lower and higher energies from said space as the respective products of the former and the latter of said nuclear reactions.

25. Apparatus to investigate matter by neutron radiation comprising, two alternately and intermittently operating neutron sources adapted by irradiating said matter with neutrons to induce said matter to itself produce radiation, and detector means disposed relative to said sources to simultaneously detect neutron radiation and gamma radiation produced by said matter in response to irradiation thereof by neutrons from said sources.

26. Apparatus to investigate the hydrogen content of matter comprising, first and second separated neutron sources each adapted to irradiate said matter with neutrons emitted therefrom to thereby induce said matter to itself produce radiation, and a detector adapted to responsive to radiation so produced by said matter to provide an output as a function of the hydrogen content of said matter, said detector being spaced from one of said sources by a distance which is more than the maximum crossover distance at which the detector output changes from a direct function to an inverse function of the hydrogen content of said matter, and said detector being spaced from the other of said sources by a distance at which said detector senses radiation produced by said matter in response to irradiation thereof by neutrons emitted from said other source.

27. Apparatus to investigate matter by neutron radiation comprising, ion source means, a pair of targets providing respective concentrations of different materials adapted to undergo different nuclear reactions with incident ions to emit respective neutron fluxes and to irradiate said matter with said fluxes, means to project from said source means ions directed by said projecting means to be incident on each of said concentration, said ion-projecting means being adapted to render of different values the impingement velocities of the ions incident on one and the other of said concentrations, and means to detect radiation produced by said matter in response to irradiation thereof by neutron fluxes emitted from said two concentrations.

28. Apparatus to investigate the hydrogen content of matter comprising, ion source means, a pair of separated targets providing respective concentrations of different materials adapted to undergo different nuclear reactions with ions when incident thereon to emit respective neutron fluxes and to irradiate said matter with said fluxes to thereby induce said matter to itself produce radiation, means to project from said source means ions directed by said projecting means to be incident on each of said concentrations, and a detector responsive to said radiation produced by said matter to provide an output as a function of the hydrogen content of said matter, said detector being spaced from one of said targets by a distance which is more than the maximum crossover distance at which the detector output changes from a direct function to an inverse function of the hydrogen content of said matter, and said detector being spaced from the other of said sources by a distance at which said detector senses radiation produced by said matter in response to irradiation thereof by neutrons emitted from said other source.

29. Apparatus to investigate matter by neutron radiation comprising, a pair of targets each adapted by reacting with incident ions to emit neutron flux of an intensity dependent on the velocity of the impinging ions, each target being adapted to irradiate said matter with the neutron flux emitted therefrom to induce said matter to itself to produce radiation, ion source means, means to project from said source means ions directed by said projecting means to be incident on said targets, said ion-projecting means being adapted to render of different values the impingement velocities of ions incident on one and the other of said targets to thereby render of different intensity values the neutron fluxes emitted from said two targets, and a detector responsive to said radiation produced by said matter to provide an output as a function of the hydrogen content of said matter, said detector being spaced from one of said targets by a distance which is more than the maximum crossover distance at which the detector output changes from a direct function to an inverse function of hydrogen content, and said detector being spaced from the other of said sources by a distance at which said detector senses radiation produced by said matter in response to irradiation thereof by neutrons emitted from said other source.

30. Apparatus to investigate matter by neutron radiation comprising, ion source means, a pair of targets providing respective concentrations of different materials adapted to undergo different nuclear reactions with incident ions to emit respective neutron fluxes and to irradiate said matter with said fluxes to thereby induce said matter to itself produce neutron and gamma radiation, means to project from said source means ions directed by said projecting means to be incident on each of said concentrations, and a detector adapted to simultaneously detect said neutron radiation and gamma radiation produced by said matter.

31. Apparatus to investigate matter by neutron radiation comprising, a pair of targets each adapted by reacting with incident ions to emit neutron flux of an intensity dependent on the velocity of the impinging ions, each target being adapted to irradiate said matter with the neutron flux emitted therefrom to thereby induce said matter to itself produce neutron and gamma radiation, ion source means, means to project from said source means ions directed by said projecting means to be incident on said targets, said ion-projecting means being adapted to render of different values the impingement velocities of ions incident on one and the other of said targets to thereby render of different intensity values the neutron fluxes emitted from said two targets, and detector means adapted to simultaneously detect said neutron radiation and gamma radiation produced by said matter.

32. In logging apparatus, a pulsed source of neutrons including a first means to produce ions and a second means energized by said first means to accelerate said ions to produce neutrons for irradiating at least one material to be examined and means for detecting the reflected and induced products of said irradiation whereby an indication of the characteristics of the material is obtained.

33. In a logging apparatus, a pulsed source of neutrons including a first means to produce ions and a second means energized by said first means to accelerate said ions to produce neutrons for irradiating at least one material to be examined and a detector adapted to be placed in proximity to said mterial, a signal source coupled to said neutron source to control neutron emission, and an indicator coupled to said detector whereby an indication of the characteristics of said material is obtained.

34. A logging apparatus comprising a pulsed neutron source including a first means to produce ions and a second means energized by said first means to accelerate said ions to produce neutrons and a detector adapted to be lowered into a well to determine the characterisitics of the strata pierced by the well, means for correlating the output of the neutron source and the energy received by the detector whereby an indication of the characteristics of said strata is obtained.

35. A logging apparatus comprising a pulsed neutron source including a first means to produce ions and a second means energized by said first means to accelerate said ions to produce neutrons and a detector adapted to be lowered into a well to determine the characterisitics of the strata pierced by the well, means for correlating the output of the neutron source and the energy received by the detector with the depth of the detector in the well whereby a time dependent indication of the characteristics of said strata along said well is obtained.

36. Apparatus to investigate matter comprising, means for irradiating matter with neutrons successively from a first origin and from a second origin to induce said matter to itself produce radiation in response to the neutrons from each of said two origins, means for detecting only neutron radiation produced by said matter in response to neutrons from said first origin, and means for detecting only gamma radiation produced by said matter in response to neutrons from said second origin.

References Cited by the Examiner
UNITED STATES PATENTS

| | | | |
|---|---|---|---|
| 2,211,668 | 8/40 | Penning | 313—61 |
| 2,374,197 | 4/45 | Hare | 313—93 X |
| 2,489,436 | 11/49 | Salisbury | 250—84.5 |
| 2,712,081 | 6/55 | Fearon et al. | 250—83.6 |

RALPH G. NILSON, *Primary Examiner.*

NORMAN H. EVANS, FREDERICK M. STRADER,
*Examiners.*

UNITED STATES PATENT OFFICE
CERTIFICATE OF CORRECTION

Patent No. 3,215,836　　　　　　　　　　　　November 2, 1965

Hugh B. Frey, Jr.

It is hereby certified that error appears in the above numbered patent requiring correction and that the said Letters Patent should read as corrected below.

Column 12, line 33, and column 13, line 10, strike out "to", second occurrence, each occurrences; column 14, line 13, for "mterial" read -- material --.

Signed and sealed this 26th day of July 1966.

(SEAL)
Attest:

ERNEST W. SWIDER　　　　　　　　　　　　EDWARD J. BRENNER
Attesting Officer　　　　　　　　　　　　Commissioner of Patents